United States Patent Office 3,560,080
Patented Feb. 2, 1971

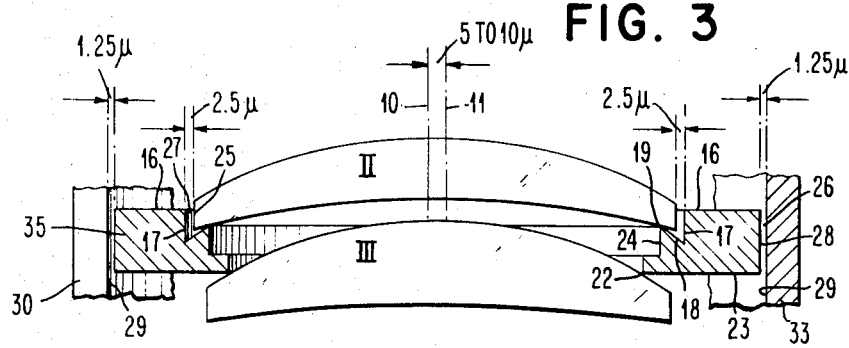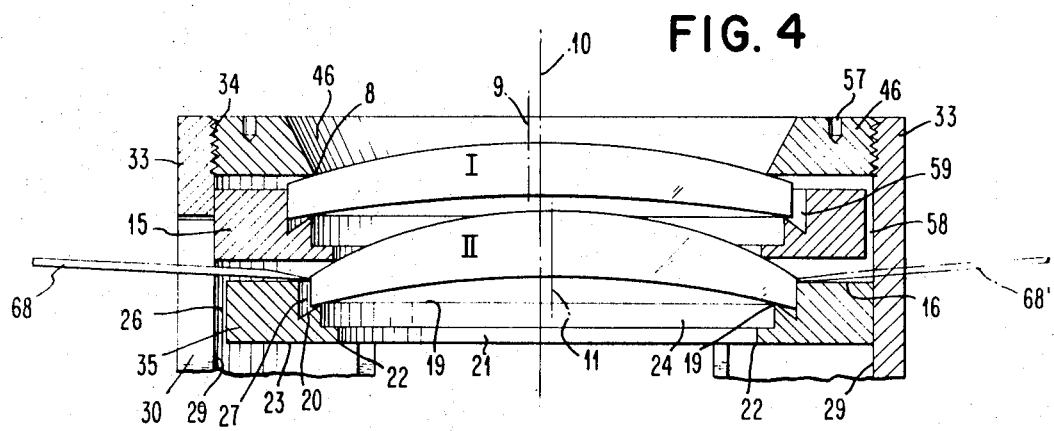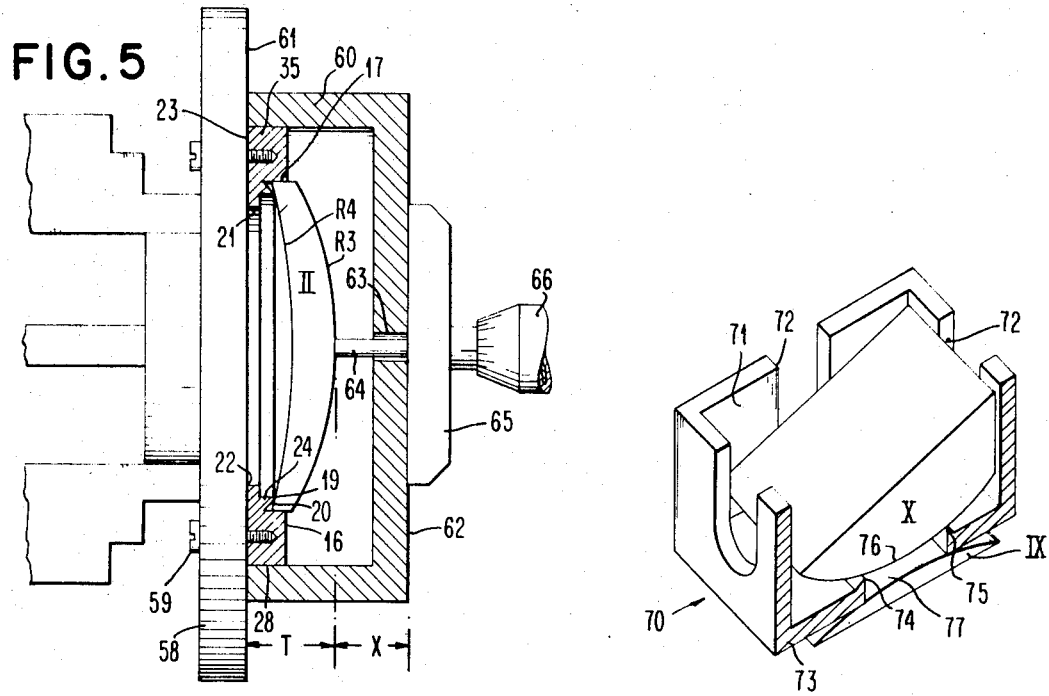

3,560,080
APPARATUS AND METHOD FOR ADJUSTABLY MOUNTING LENSES
Janusz S. Wilczynski, Ossining, N.Y., and William G. Santy, New Canaan, Conn., assignors to International Business Machines Corporation, Armonk, N.Y., a corporation of New York
Filed Jan. 9, 1967, Ser. No. 608,046
Int. Cl. G02b 7/02
U.S. Cl. 350—252
2 Claims

ABSTRACT OF THE DISCLOSURE

A lens mount assembly for mounting a plurality of lens components aligned in order from front to rear, with the rear component fixed and the other components adjustable rotatably and transversely, comprises an inner stationary barrel having a rearmost flange in which the rear lens component is mounted, the barrel having a plurality of axially extending access slots evenly spaced around the barrel. The barrel contains a diaphragm between lens components which has adjustament means projecting through one of the slots. A plurality of mounting spacer rings formed with ridges is located between and has loosely mounted thereon the lens components. A clamping ring is threaded into the front end of the inner barrel to clamp the lens components into adjusted positions. An outer barrel fits over the inner barrel and is fastened thereto.

---

The invention is illustrated in connection with a particular lens system involving a plurality of elements as set forth in a copending patent application Ser. No. 600,158 by Wilczynski and Tibbetts, filed on Dec. 8, 1966, for "Variable Reduction Lens System."

In the prior art the means and methods of providing lens mounting devices are essentially of two different characters. There is a rather crude form wherein each lens is separately assembled within a ring which is clamped by spinning a portion of the ring against the lens periphery and then a series of such rings are directly assembled with close tolerances within a barrel. This rather crude form provides no means of adjustment for variations in the optical characteristics of the separate lenses. Then in a second variety, there is the rather sophisticated form of mounting and assembling wherein each lens element is custom fitted within a rather elaborate ring which provides individual clamping means for taking into consideration the individual characteristics of the particular lens. When several of such sophisticated rings are brought together, it is evident that a rather expensive instrument is involved. In the present case the mounting apparatus and method takes a novel form wherein the economics of the device are preserved and at the same time a very sophisticated form of adjustment is provided making allowances for optical deficiencies of a plurality of lenses and yet correcting separately for such deviations and then clamping the whole to provide an over-all optical element having the excellent qualities of the highly sophisticated and expensive form of mount while at the same time providing an economical instrument made up of simple elements. The way this advance result is arrived at here is by providing a certain amount of loose play or float not only with respect to the way each mounting ring fits within its encasing barrel, but also with respect to each lens within its own retaining ring spacer. The rings are so shaped that the contact with the lens which it supports and also the contact with the lens upon which it rests is merely a line contact or knife edge form of cooperation which not only provides a highly accurate form of cooperation, but it also provides a good frictional form of cooperation so that when the parts are adjusted they stay in the adjusted positions.

With the lenses and mounting rings having such loose play or float in all directions it is possible to not only rotate each lens and mount to correct for astigmatism and coma and also shift the lens and/or ring laterally in any radial direction of the 360° to put an actual optical center where it should have been to be truly optically centered with respect to the optical instrument as a whole.

From the foregoing it is apparent that the invention relates generally to methods and apparatus for adjustably mounting lenses in an optical instrument and more particularly to mounting means involving the provision of simple and economical loose mounting spacer rings and an apertured casing therefor to provide access for adjustable movements of both lenses and rings to form a corrected optical instrument of a very economical and yet sophisticated form.

An object of the invention is to provide an economical form of lens mounting ring which is so shaped as to function not only as an adjustable lens mounting support but also a lens spacer. When the lenses are circular, the mounting rings are of an annular confirmation and provided with an outside shoulder calculated to provide the loose play for the lens contained therein. There are several critical but nonexpensive surfaces to be established on each ring, the one being the shelf surface provided by a slanted inside annular ridge upon which the encased lens is supported. Another critical part of the mounting ring is the internal and bottom corner edge which rests upon the adjacent lens within the mounting. Of course there is also the outside diameter of the mounting ring which is arranged to have a somewhat smaller amount of loose play than the play between the ring shoulder and the lens. These two critical pointed circular line contact configurations between the supported lens and the adjacent lens with the ring between them provide frictional contact and support in two ways, to preserve plural lens element spacing and adjustment in two ways. First, to provide loose play for adjustment, and secondly, to provide pointed ring line contact for frictional preservation of such adjustment. In fact, when sufficient clamp pressure is brought to bear between the adjusted lenses and the metallic rings, there is a certain amount of ring bite or distortion tending to hold the parts in position.

Another object of the invention is the provision of an optical instrument comprising one or more adjustable lens elements and rings, said elements and rings being encased in a cylindrical barrel formed with slots or apertures for a wide range of openings so that lateral and rotative adjustment may be made in all directions to compensate for deficiencies in the manufacture of the separate elements making up the entire instrument.

Another object of the invention is to provide a method for very simply and inexpensively adjusting lens elements to provide a highly corrected optical device at low cost. Since the advent of miniaturization in the production of integrated circuits, semiconductor arrays, printed circuit artwork and microfilm recording and reproduction there is an increasing demand of optics of superior quality that this invention makes possible to achieve.

Another object of the invention is the provision of an improved method for fabricating spacer mount rings and lens assemblies. The fabrication method involves attachment of the mount ring to the headstock of a lathe and assembly of the lens therewith and gauging directly as interspersed steps between cuts of the lens support ridge on the ring to thereby directly custom fit each lens to each particular simple ring with an over-all spacing calculated to provide the necessary space between lens elements in the final optical instrument. For gauging purposes, a gauge cup is slipped over the ring and lens while on the lathe headstock and the cup has a flat rim and a flat base with a top opening through which a depth micrometer is inserted through the cup opening to touch the top of the assembled lens and thus gauge the exact dimensions from the bottom of the ring to the top of the radius of the lens. Thus the height of each assembled optical element may be gauged to be accurately proportioned within the limits of less than a micron.

Another object of the invention is the provision of a novel and useful method of mounting one or more lens and ring assemblies in an optical instrument including an outer holding barrel formed with apertures for access to the internal elements. The novel method comprises the step of forming loosely proportioned but confining mounting rings for each lens. Since each optical element comprising a lens and associated support ring is free, a wide variety of adjustments are possible for one or all lenses and supports. In the case of a plural lens mount within an optical instrument, the several lens assemblies are inserted axially into the receiving barrel. They assume axial registration positions very accurately because, as previously noted, each lens and ring assembly is custom fitted to be of an accurate over-all height dimension as custom fitted according to the lens thickness. When so brought together within the barrel, it is arranged that the height of each outer ring shoulder is lower than the height of the corresponding lens edge so that one may reach in through the barrel and push or rotate the lens relative to the shoulder on the ring to take up space in any direction and arrange the lens rotatively in any radial angle. The assembly method also includes the shifting of the lens supporting rings independently of or in conjunction with the shifting of the lens above and below the ring. This is done also through the apertures in the confining barrel. During the assembly steps the weight of the elements, plus the spacer conformations with relatively sharp metallic ridges engaging the ocular surfaces of the lens elements, tends to hold them in position before clamping with an outer ring threaded within the barrel. By means of the noted method of assembly, many trifling but important errors in the lens conformation may be rectified, such errors including optical decentralization, and departures from calculated values of coma, astigmatism, spherical aberration, etc.

Another object of the invention is the provision of a method of gauging optical elements wherein the lens itself is used as part of the gauging apparatus.

Another object of the invention is the provision of a mode of fabricating a complex optical instrument wherein the lens structures have relatively flat lens curves and the metallic mounts therefore are simple rings easily machined with sharp edges engaging more than one lens surface, all of which features add up to an inexpensive and yet highly accurate method of assembling a complex optical structure.

Another object of the present invention is to provide a corrective lens system wherein provisions are made for changes to remedy economical forms of production of optical and mechanical elements so that high image quality results from the assembly of simple elements adjusted by simple methods to effect low cost of manufacture.

The foregoing and other objects, features and advantages of the invention will be apparent from the following more particular description of a preferred embodiment of the invention as illustrated in the accompanying drawings.

In the drawings:

FIG. 3 is a sectional elevation view of a single lens and mounting ring assembly proportioned with clearances and points of contacts exaggerated in order to emphasize the floating mount style of adjustment of the present invention.

FIG. 4 is a sectional elevation view showing a pair of lens and mounting ring assemblies with adjustment shown in exaggerated form to illustrate how the amount of loose play relative to lenses and mounting rings is taken up in order to remedy defects of the various elements.

FIG. 5 is a sectional elevation view showing a single lens and mounting ring assembly as it is being gauged for over-all dimensions while mounted on the face plate of a lathe.

FIG. 6 is a perspective view of a prism in an adjustable mounting.

Although shown mainly in connection with circular lenses and mounting rings it is apparent that the mounting of square, triangular or other regular polygonal shapes of lens or prism elements could benefit by the use of the teachings of the present invention.

Figure 1:
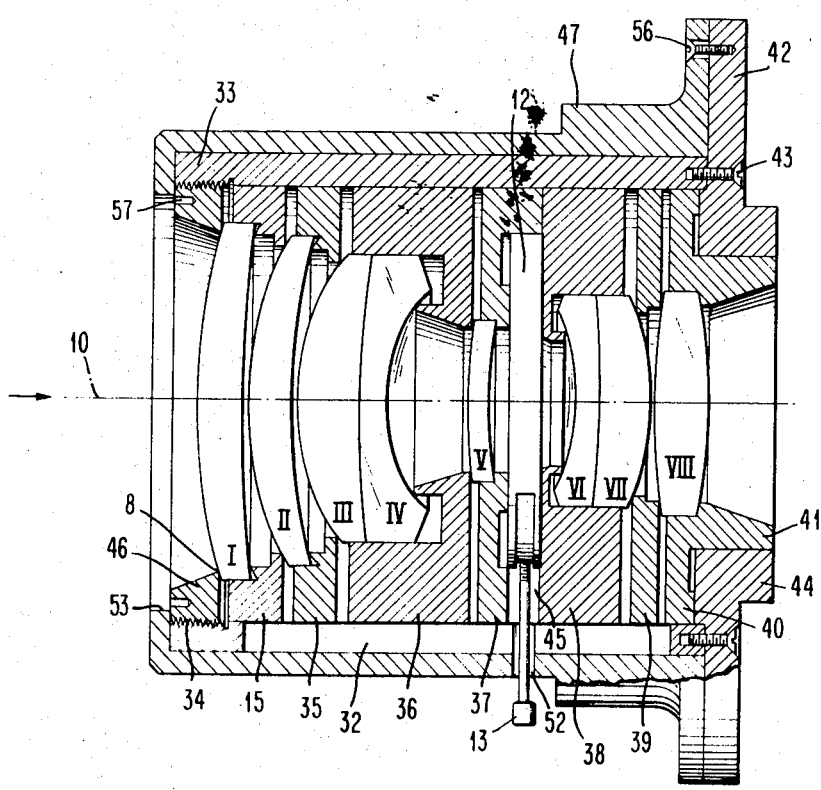
FIG. 1 is a sectional elevation view taken along line 1—1 in FIG. 2 through the optical axis of the entire assembled optical instrument.

Referring to FIG. 1 an embodiment of a high quality reduction lens is shown including eight lens elements designated as elements I, II, III, IV, V, VI, VII and VIII. Lens elements I and II are meniscus singlet lenses, lens elements III and IV are cemented together to form a meniscus doublet lens, lens element V is a negative meniscus single lens, lens elements VI and VII are cemented together to form a meniscus doublet lens, and lens element VIII is a bi-convex lens. The lenses are optically aligned on an axis 10, and a diaphragm 12 is provided between lens elements V and VI.

At 5461 angstroms, the lens system of FIG. 1 has an effective focal length of 113.62 millimeters, a black focal length of 59.26 millimeters, and a front focal length of 46.78 millimeters designed for a reduction of 20×.

The diaphragm 12 is ordinarily at an opening 20.8 millimeters diameter at $f/3$ and is located 3.7 millimeters to the right of the lens element V. An adjustment lever 13 extends from the diaphragm 12 and is suited for either manual or automatic adjustment of the iris opening. It is contemplated that the iris opening may be varied from about $f/2.8$ to $f/11.0$.

Figure 2:
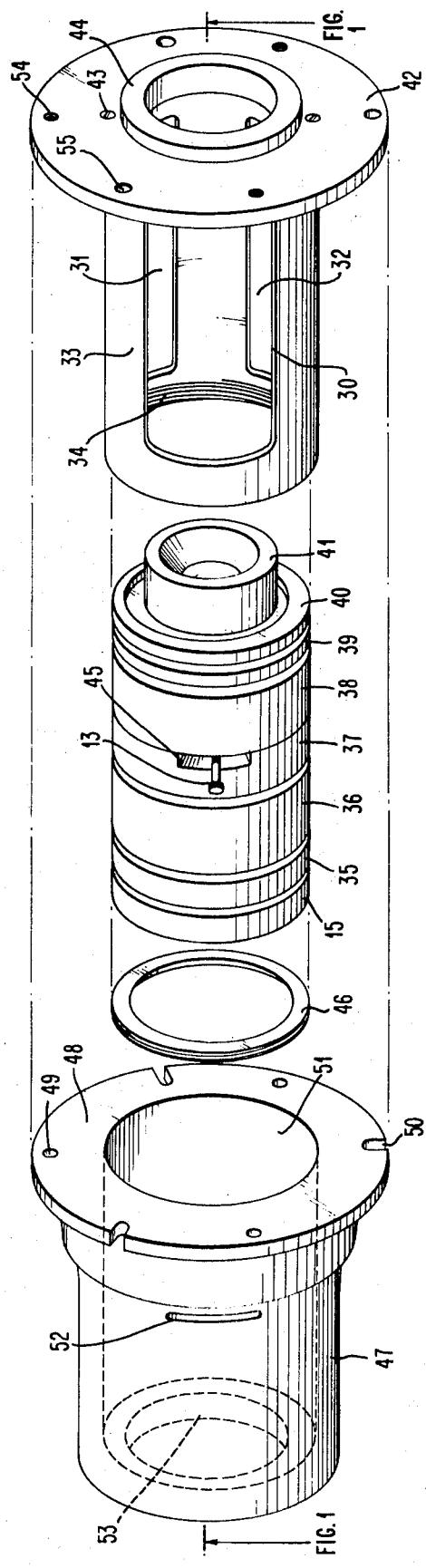
FIG. 2 is an exploded perspective view showing the many elements of the optical instrument spread along the axis of the instrument as they would appear before assembly.

FIGS. 1 and 2 relate generally to the over-all optical lens system while FIGS. 4, 5 and 6 are directed to more specific details of the invention such as the so called loose play or float of the various elements. It is to be realized, however, that the term loose play when used here is a relative term and ont implying extreme degrees of looseness. The measurements involved are those calculated in microns, for example, the clearances between the outside diameter of the ring elements and the inside of the assembly barrel is nearly 2.5 microns while the clearance between the inside shoulder of the ring and the outside diameter of the lens element is a clearance of only 5 microns. It is contemplated that there is to be a maximum deviation from the optical center of any lens element of no more than about 10 microns. Therefore it is contemplated that a uniform high correction of the lens system is to be attained by very slight but very important adjustments of either the lens or the ring or both and it is this selective adjustment of many elements which together produce an ideal optical system. Since the main causes of the poor performance of lens systems in the prior art are due to poor lens centering, and as a result nonrotationally symmetrical coma, astigmatism and distortion, the adjustments provided herein provide simple means for overcoming all of these defects by rotative and lateral adjustment of each element and all elements relative to each other.

Although as shown in FIG. 1 with a fixed lens system, it is apparent that the advantages of the invention would apply also to a system having variable components, when such components are arranged to avoid displacing the adjusted elements previously set in position.

Turning now to FIG. 1 for a general overall consideration of the elements making up the lens system, it is noted that the eight lenses, designated I to VIII from left to right and arranged regularly along an optical center 10, are spaced within a barrel 33 by means of a series of shaped mounting rings or spacers designated from left to right as 15, 35, 36, 37, 38, 39 and 40 there being separate rings for most of the lenses but in the case of lenses III and IV the two are connected and mounted within the single mounting ring 36. The same applies also to the doublet lenses VI and VII being held within the ring 38. There is a general modus operandi regarding the assembly of the various elements by means of the shaping of the several rings 35–40. Taking the one ring numbered 35, for example, and assuming that the six, first to be assembled, lenses III–VIII are already in the barrel, then it is noted when the ring 35 is dropped therein, referring also to FIG. 3, the lower rib, or base edge, 22 formed on the lower flat side of the ring 35 rests upon the outer radius of lens number III. This provides one degree of spacing control. The other point of spacing control is also illustrated in FIG. 3 where it is seen that the inside radius of the lens number II rests upon a knife edge ridge 19 formed as a shelf around the inside diameter of the lens mounting ring 35.

Referring back to FIG. 1 it is seen that these features of ring 35 being supported upon lens III and in turn supporting lens II is a characteristic noted with respect to all the other spacers and mounting rings. Before going into detail regarding other features of a mounting ring such as 35, it is believed advisable at this point to explain more generally the features of construction of the whole optical system. In doing so we may note that the barrel 33 is formed with a slot opening 30 as shown in FIG. 1 and that there are three such slots 30, 31 and 32 as shown in FIG. 2. It is through these access opening slots in the lens element confining barrel that the lateral and rotative adjustment is made as noted hereinafter.

Returning to consideration of the general over-all configuration of the lens system in FIG. 1, it is seen that a flange 42 is provided with a number of screws 43 for attaching the barrel 33 to the enlarged member which is more readily secured to an optical system. After the several lens elements are assembled within the barrel, they are clamped therein by means of a threaded retaining ring 46 having external threads which are rotated within the threaded end of barrel 33 by means of a series of spanner openings 57.

After all the lens elements are assembled, adjusted and clamped into position, the unit is inserted into an outer casing 47 which is provided with a series of openings 49 through which pass the fastening screws 56 to attach the casing to the flange 42. The left end of the outer casing is formed with a wide opening 53 through which the image forming rays enter the lens. Such rays then pass through and leave the optical system at the back through the central opening of the spacer 41.

Although the appearance, location and assembly of the parts are very well illustrated in the sectional view, FIG. 1, an enhanced appreciation of the characteristics of the lens system may be more fully realized by observing the shapes of the various parts as they appear in the exploded perspective view, FIG. 2. At the right in FIG. 2 it is noted that the inner barrel 33 is formed with three rather large slot-like axial apertures 30, 31 and 32 which are noted hereinafter as the openings giving ready access to all of the elements of the lens system for adjustment of each individual lens and each individual ring when assembled and before being damped and covered with the outer barrel 47. At the right, the inner barrel 33 is seen to be secured to the left face of the large flange 42 by means of a series of screws 43 threaded into the bottom of the barrel.

At the center of FIG. 2 the lens assemblies are shown without the lenses appearing because of the angle of the showing. However, it will be realized that for each of the optical elements the lenses are understood to be within the various spacers 15 and 35 to 40 inclusive. Although shown horizontally, with the lens assembly in a horizontal position, it will be understood that when the lens elements are being assembled, the unit will be arranged so that the flange 42 is placed on a horizontal surface and the lens elements starting with the spacer 41 are lowered down vertically into the barrel 33, the opening 34 of the barrel 33 being at the top of the vertical arrangement at that time.

Returning now to the left-to-right perspective showing, FIG. 2, which is purely illustrative for the purpose of distending the parts so that each one may be examined separately, it will be noted there that the retainer ring 46 is at the left of the lens assembly and when finally assembled it is brought over the top of the inner barrel 33 and screwed down within threads 34 by means of a spanner tool engaging in several of the apertures 57 arranged in the outside face.

It is well to mention here that the various spacers and other casing elements are usually made of aluminum although it is possible to use some other metal or hard plastic, such as brass or stainless steel or any of the durable platics, such as Teflon, nylon or even ceramics.

After the assembly of the lens elements has been placed in the inner barrel 33 and adjusted therein and clamped by the ring 46, then the outer casing 47 at the left in FIG. 2 is brought over all the elements so that the flange 48 of the outer barrel is brought against the inner surface of the flange 42 of the inner barrel. Then these two flanges 42 and 48 are secured together by a series of screws 56 passing through openings 49 and into tapped holes 54. There is also a series of slotted peripheral apertures 50 proportioned for securing the lens assembly as a whole to some main optical instrument such as a projector or a camera.

Again referring to the outer casing 47 at the left in FIG. 2, it is noted that it is formed with an arcuate peripheral aperture 52 through which the stem 13 is to project for adjustment of the iris opening of the diaphragm 12. Although the stem 13 is shown assembled at the center in FIG. 2, this is merely for purpose of illustration because the stem is actually put in place after the outer barrel 47 has been assembled over all the elements. The outer barrel not only provides a protective cover and a solid means for securing the device to a main instrument, but it also provides dustproofing and protects the interior elements from other disturbances such as accidental displacement of any of the elements.

At this point in the description it is well to recapitulate what has gone before and the scope of the description to follow hereafter. With reference to FIGS. 1 and 2 there has been described a series of assembly steps for bringing the various lenses and mounting assembly rings together into a packaged lens assembly suited for adjustment. Now hereinafter with respect to the FIGS. 3, 4, 5 and 6, the details of construction are about to be set forth. With reference to FIG. 5 it is proposed to explain exactly how each lens and ring assembly is to be gauged and proportioned by successive cuts on the critical parts of the mounting ring so that the entire lens assembly unit is accurately proportioned. FIG. 5 shows diagrammatically how a space ring is machined on a lathe starting with the ridge supporting the lens having a knife edge which is deburred and then gauged and successive cuts taken until the over-all dimension of the lens and ring assembly is exactly as desired. Then with reference to FIG. 3 in the exaggerated showings of clearances therein it is to be pointed out how the lens and ring assembly fits within the inner barrel. The FIG. 4 showing provides means for explaining how a plurality of lenses are to be adjusted laterally and rotatively to correct for any deficiencies in any component of the lens 50. FIG. 6 shows that the spacer mounting structure need not be circular and that the optical elements may be of an angular form such as the shape of a prism.

For the particular shaping and spacing and composition of the lens elements per se, reference may be made to the detailed explanation given in the aforementioned copnding application Ser. No. 600,158 filed on Dec. 8, 1966.

For purposes of illustration of the mode of manufacturing and gauging shown in FIG. 5, the lens number II, which is a meniscus singlet lens with an outer radius $R_3$ and an inner radius $R_4$, is taken as the item of the example.

As a first step for the formation of the lens and ring assembly as shown in FIG. 5, the base face of the spacer ring 35 is fastened to the face plate 58 at the left which is understood to be on the headstock of a lathe (not shown) at the left. The ring is secured by a number of screws 59 through the plate 58 to secure and centralize the ring 35 on the lathe. Then various cuts are taken to form the exact shape of the ring, a cross-section of which is also shown in FIG. 3. The inner opening comprising an inner annular rib 21 having a sharp lower right angle edge 22, is cut in the center of the ring 35 and then the ring is also trimmed on the outside to provide an outside diameter subtended by surface 28. The flat lower surface 23 is a face finished before the ring is attached in the lathe, and the height of the outer raised shoulder of the ring is determined by a cut to form the upper surface 16 which is always gauged to be lower than the corner formed by radius $R_3$ with the other periphery of the lens II. This difference in height is arranged so that when the parts are assembled, an instrument 68, FIG. 4, may be inserted to push the lens within the shoulder formed on the ring. This inner shoulder comprising the inner surface 17, FIGS. 3 and 5, and the lower shelf or dished-out part 18 is cut to permit an amount of free play of about 5 microns across the diameter of the inner ring and to be that much larger than the outer periphery of the lens. Also formed on the ring is an annular ridge 24 extending to a knife edge 19 which is deburred before the lens is mounted thereon. This knife edge is created by cutting down the slanted portion 20 of the inner shape of the ridge while the outer shape 24 provides the inner diameter of the ring aside from the extending rib 21.

With the general outline of the mounting ring now explained with reference to FIG. 5 it may be pointed out how the accurate dimension T is finally arrived at by a series of micrometer gauging steps in cooperation with the parts directly mounted on the lathe. When it is desired to gauge the part, the lens II is assembled on the preliminary form of the ring 35, as shown, and then a gauging cup 60 is assembled over the ring and this cup has not only a very accurate surface along the cup rim at the left in cooperation with the flange 61, but it also has a very accurate flat outer surface 62 which provides a gauge surface for the outer measurement of the $T+X$ measurement shown at the bottom. The cup 60 is formed with a central opening 63 and it is through this opening that the probe 64 of a depth micrometer 66 is inserted while a contact reference extension 65 of the micrometer is brought into contact with the flat surface 62 of the cup part of the gauge. Then, when the micrometer 66 measures the distance X very accurately, it is possible to determine the remaining T which is the dimension of the overall lens assembly of lens and ring. Since the first measurement T is usually oversized, it is determined from the first gauging step how much of a cut is to be taken off the slanted surface 20 so that the knife edge 19 is lowered to bring the lens radius $R_3$ down to the proper position with respect to the inner edge 22 which is the determining factor for registration with the next successive lens upon which it is perched in the final assembly.

It is found by experience that two or three such successive steps of gauging and removing the cup, micrometer, and lens and turning down of the sloping surface 20 results in a final dimension T which is the one sought in order to bring the lens elements in properly spaced condition with respect to others of the final lens assembly. Should the ring shoulder surface 16 remain too high after a number of cuts into the knife edge 19, then another machining operation is performed on surface 16 to lower it to a level so that access may be had to the top of the lens periphery. It is understood that not only the lens assembly with lens II, but all the other elements are machined and gauged as shown in FIG. 5 so that when the entire lens assembly is placed together, all the parts fit axially in a very accurate manner.

Now reference may be made to FIG. 3 where the lens II and its accompanying mounting ring 35 is shown as assembled within the inner diameter 29 of the inner barrel 33 which is the lens and ring supporting means. In this view the degrees of play or clearance or float previously mentioned are exaggerated in order to emphasize the capacity for adjustment as noted throughout this specification. For example, it is noted in FIG. 3 that there is an extent of clearance 26 existing between the outer periphery 28 of the mounting ring 35 and the inner diameter 29 of the retaining barrel. The actual proportion of this clearance is approximately 1.25 microns, in other words the difference between the external diameter of the ring 35 and the internal diameter of the barrel is approximately 2.5 microns total difference. Then there is also the clearance represented by space 27 which is the distance between the internal diameter 17 of the ring 35 and the external periphery diameter surface 25 of the lens II. This space 27 is approximately 2.5 microns so that considered in over-all diameter measurements there is approximately 5 microns difference between the outer surface of the lens and the inner surface of the annular shoulder on the ring 35.

Two center lines 10 and 11 are shown running vertically through the center of the lens. The former being to represent the true optical axis and the other line 11 representing what might exist because of the actual center of the lens being off the optical center as an error in the production and grinding of the lens. This space which is presumed to be a maximum error of 5 to 10 microns has the possibility of existing in any range between the allotted maximum error and it is for one purpose of correction that the spaces 26 and 27 are provided so that a remedy may be effected by pushing the lens from one side to the other to bring the actual optical center into the line with the true optical axis aligned with all other true centers of the other optical elements. A rather radical example of adjustment is shown in the following view, FIG. 4, where, for purposes of illustration, it is assumed that the full capacity of correction is required to one side for lens number I and a correction to the opposite side to the full extent for lens number II.

The star test procedure in optical element testing involves the projection or observation of an image of minute sources through an optical element and the relation of such an image to a frame of reference. This also involves the observation of centering or the optical trueness of the assembly tested.

In FIG. 4 the parts are shown with the clamping ring 46 loosely assembled and it is assumed that all the lower lens elements have been adjusted, that is, the elements involving lenses III–VIII inclusive, and it is only the two top lenses and their spacer rings which are to be registered to provide either rotative or lateral correction or both for producing a highly corrective lens assembly. Assuming that the top lens I is off-centered to the amount shown by the center lines 9 and 10, then a degree of adjustment may be made by hand by pushing both the lens I and its mounting ring 15 over to the left as shown for the maximum amount of takeup of clearance, assuming that the full amount of clearance is necessary. Then too, the underlying lens II may be assumed to be off-center in the opposite direction to the degree shown by the center line 11, and then a flat instrument 68 may be projected through the slot opening 30 in the barrel 33 and the lens number II pushed to the right as shown and also the retaining ring 35 pushed to the right if such a degree of adjustment is necessary. Since the opening 30 is of such a wide extent, it is clear to see that a finger may be used at times for the rotative and lateral adjustment of any of the retaining rings, such as the ring 35. When once pushed or rotated into the aligned and desired positions, it is obvious that the knife edges 19 and 22 of each successive mounting ring in cooperation with two lenses tends to hold them in the set position and retain them there once the retaining ring 46 with its knife edge 8 is screwed down into the end of the inner barrel 33. In FIG. 1 it is also shown that this clamping or retaining ring 46 is provided with the annular inner knife edge 8 which cooperates with the outer radius of lens number I to provide a firm and frictional form of biting clamp.

Here again it may be noted that this inexpensive way of forming a highly corrected lens assembly is consistent with a quality product at a modest cost.

In the process of adjusting a plurality of the lens components in the barrel, the adjustment process is started at the bottom, i.e., at the right of the showing as shown in FIG. 1, which at the time is resting horizontally with the flange 42 on a horizontal plate and the open end of the barrel 33 extending upwardly. The operator reaches in through one of the slots 30–32 and first engages a certain portion of the side of the spacer 39 and either shoves it to the left or right or rotates it slightly in order to orient the optical test view as he observes it while shifting the mechanical members. After the spacer is located, then the lens VI–VII is adjusted by either rotating it or shifting it, or both, in the manner revealed by FIG. 4 showing how the lenses I and II were shifted to take up the loose play either wholly as at 58 or 59 or partly to remedy the optical defects of the particular lenses. After the bottom adjustable lens VI–VII has been adjusted, then the procedure is repeated successively towards the top of the lens mount with the pressure and weight of the upper elements tending to hold the parts in the adjusted position, especially in view of the sharp edges and knife edges of the spacers tending to remain where they are placed. As adjustment takes place, the clamping ring 46 is loosened at the time and clamped with a slight amount of pressure whenever desired and of course when the compound lens is entirely adjusted from top to bottom, then the clamping pressure is applied to hold all the parts rather rigidly. Every time an adjustment is made the star image is observed and its behaviour noticed.

FIG. 6 shows an alternative form of optical element and holder assembly 70 with adjustable features much the same as those of the other views. However, it is noted that the holder for the optical prism element X is a rectangular box 73 with a series of straight side walls or shoulders 71 and a depression and bottom shelf with a central opening 77 is bordered by a pair of straight ridges 74, 75 formed with the knife edges upon which the lower arcuate surface of prism X rests. The lower sharp edges of square opening 77 rest upon a lower optical element IX which is adjustable therein. A series of slots 72 opening in the side walls 71 of the mounting holder 73 afford access to all edges of prism X, and it is understood that holder 73 is adjustably held in a rectangular tube or box with other elements in the fashion noted in connection with barrel 33.

Here again with reference to the possible uses of the principles of construction and assembly of the lenses shown in this disclosure it should be realized that the teachings are not confined to use in conjunction with circular lenses when it is apparent that other polygonal shapes of lenses and prisms may be so adjusted also and result in an economical and yet highly sophisticated instrument.

Because of the knife edge mountings between respective lens surfaces and the edges on the intermediate mounting rings, it is possible not only to have lateral and rotative adjustment, but also axial adjustment regulated by the amount of pressure put upon the retaining ring when screwed down and exerted upon all successive elements.

Although hereinbefore it is mentioned that the lens assembly has many advantages and utility in a large number of fields mainly because of its inexpensive and yet highly sophisticated and regulated form of optical correction, it is well to also enumerate a number of other advantages. Among such advantages are the advantage that when a mistake in spacing is made, the only amount of scrap is the simple and inexpensive mounting rings which need to be discarded. Another advantage is the possibility to use poorly centered glass lens elements with an over-all possibility of being able to shift the optical center between 5 and 10 microns which permits the use of many elements which would otherwise either have to be discarded or remain to impair the usefulness of the entire lens assembly.

While the invention has been particularly shown and described with reference to a preferred embodiment thereof, it will be understood by those skilled in the art that various changes in form and detail may be made therein without departing from the spirit and scope of the invention.

What is claimed is:

1. A lens mount assembly for mounting a plurality of components of a lens, the lens components including:
    a plurality of lens components optically aligned in order from the rear to the front, with the rear component fixed and the other components adjustable rotatably and transversely,
    said lens mount comprising an inner stationary barrel having a rearmost flange in which is mounted said rear lens component, said barrel having a series of three axially extending access slots evenly spaced around said barrel,
    a diaphragm in said barrel between lens components and having adjustment means projecting through one of said slots,
    a series of mounting spacer rings formed with ridges and placed between said lens components and in which respective lenses are loosely mounted on said ridges, said spacers resting on the surface of one lens while serving as the mount for the next successively arranged lens, said rings being loosely fitted inside said barrel through the slots of which the lenses and spacers are rotatively and transversely adjustable,
    a clamping ring threaded in the front end of said inner barrel and cooperating with the front lens component to clamp it and all other lens components under it in their adjusted positions, and
    an outer barrel casing fitting over said inner barrel and formed with a flange fastened to said flange of the inner barrel and having other attachable means.

2. An adjustable optical element mounting structure with an open center and outer raised shoulder means to confine an optical element adjustably over an inner shelf, said structure being a ring, said shoulder means being an annular shoulder surrounding said shelf, said shelf being an annular inner extension formed with an inner open ridge sloped up inwardly to form an inner upward annular knife edge upon which the surface of a first optical element is supported and formed with an inner base extension having a bottom annular sharp edge for resting on the surface of a second optical element, said raised shoulder means being an annular shoulder surrounding said shelf, the height of said annular shoulder being lower than the height of the edge of the optical element, whereby access to the edge of the optical element is afforded to adjust the lens within the loose confines of said shoulder, the outer limits of said mounting structure being proportioned to have outer space play relative to a holder therefor, within said outer raised shoulder there being extra inner space with inner play for the optical element, whereby said optical element is adjustable relative to said inner space play and its mounting structure is adjustable relative to outer space play for dual adjustment, a cylindrical barrel surrounding said ring with free play space, said barrel being formed with a plurality of axially arranged slots through which said optical element may be adjustably placed on said shelf and said ring adjustably placed in said barrel, and means for retaining said optical element and ring in the barrel in the adjusted placements.

References Cited

UNITED STATES PATENTS

| | | | |
|---|---|---|---|
| 870,535 | 11/1907 | Bausch | 350—253 |
| 1,118,187 | 11/1914 | Depue | 350—252 |
| 1,722,520 | 7/1929 | Clancy | 350—252 |
| 2,240,827 | 5/1941 | Bangert | 350—252 |
| 2,668,469 | 2/1954 | Gabel | 350—252 |
| 3,249,008 | 5/1966 | Angenieux | 350—247 |
| 3,359,849 | 12/1967 | Friedman | 350—247 |

DAVID SCHONBERG, Primary Examiner

M. J. TOKAR, Assistant Examiner

U.S. Cl. X.R.

350—247